(12) United States Patent
Németh et al.

(10) Patent No.: US 11,083,289 B2
(45) Date of Patent: Aug. 10, 2021

(54) CONNECTING DEVICE FOR MODULAR METAL SHELVING PROPS

(71) Applicant: AR SHELVING SOCIEDAD ANONIMA, Galdacano (ES)

(72) Inventors: Tibor Németh, Galdacano (ES); Inaki Carrasco López, Galdacano (ES)

(73) Assignee: AR SHELVING SOCIEDAD ANONIMA, Galdacano (ES)

( * ) Notice: Subject to any disclaimer, the term of this patent is extended or adjusted under 35 U.S.C. 154(b) by 0 days.

(21) Appl. No.: 16/924,343

(22) Filed: Jul. 9, 2020

(65) Prior Publication Data
US 2021/0007479 A1  Jan. 14, 2021

(30) Foreign Application Priority Data
Jul. 9, 2019 (ES) ............................... ES201930633

(51) Int. Cl.
*A47B 57/22* (2006.01)
*A47B 47/02* (2006.01)
*A47B 96/14* (2006.01)
*A47B 87/02* (2006.01)

(52) U.S. Cl.
CPC ............ *A47B 57/22* (2013.01); *A47B 47/021* (2013.01); *A47B 87/0215* (2013.01); *A47B 96/145* (2013.01); *A47B 96/1458* (2013.01); *A47B 96/1408* (2013.01); *A47B 2230/0003* (2013.01)

(58) Field of Classification Search
CPC ... A47B 57/22; A47B 47/021; A47B 96/1408; A47B 2230/0003; A47B 87/007; A47B 87/02; A47B 87/0207; A47B 87/0215; A47B 87/0223; A47B 96/14; A47B 96/1416; A47B 96/145; A47B 96/1458; A47B 2096/1491; F16B 12/22; F16B 12/34; F16B 5/0032; F16B 5/0036; Y10T 403/57; Y10T 403/5741; Y10T 403/70;
(Continued)

(56) References Cited

U.S. PATENT DOCUMENTS 3,056,507 A * 10/1962 Squires, Jr. ............ A47B 57/18
  108/106
3,346,126 A * 10/1967 Bloom ................... A47B 57/50
  211/192

(Continued)

FOREIGN PATENT DOCUMENTS

ES   1193364 U   10/2017

*Primary Examiner* — Jennifer E. Novosad
(74) *Attorney, Agent, or Firm* — Perry + Currier Inc.

(57) ABSTRACT

A device for connecting modular metal shelving units, comprising at least two props (1) and at least one connecting element (2), for mutual coupling of the two props (1). Each prop (1) comprises central couplings (14), first distal couplings (16) and second distal couplings (17), and each of the couplings (14,16,17) comprises a central coupling (11) and a first adjustment slot (12). The connecting element (2) comprises a first grouping (21) of pins (20), which can be inserted into the first distal couplings (16) of a prop (1), and a second grouping (22) of pins (20), which can be inserted into the second distal couplings (17) of another prop (1). The first adjustment slot (12) of the first distal couplings (16) is diametrically opposed to the first adjustment slots (12) of the central couplings (14) and the second distal couplings (17).

6 Claims, 5 Drawing Sheets

(58) Field of Classification Search
CPC ......... Y10T 403/7015; Y10T 403/7037; Y10T 403/7043
USPC ........ 211/190, 188, 194, 191, 187; 403/286, 403/109.2, 109.8, 292, 294, 298, 300, 403/306, 345, 353, 360, 363
See application file for complete search history.

(56) References Cited

U.S. PATENT DOCUMENTS

| | | | | |
|---|---|---|---|---|
| 3,448,955 | A * | 6/1969 | Fussell | F16L 3/00 248/58 |
| 3,612,585 | A * | 10/1971 | Mayr | E06B 3/98 403/264 |
| 3,731,956 | A * | 5/1973 | Hanley | E04B 1/6179 52/481.2 |
| 3,788,242 | A * | 1/1974 | Hassel | A47B 57/08 108/107 |
| 3,905,483 | A * | 9/1975 | Patrick | F16M 11/045 211/190 |
| 4,102,276 | A * | 7/1978 | Roveroni | A47F 5/116 108/156 |
| 4,180,003 | A * | 12/1979 | Clement | A47B 57/16 108/147.15 |
| 4,335,973 | A * | 6/1982 | Beck | E04B 9/10 403/205 |
| 4,380,298 | A * | 4/1983 | Harig | F16B 2/241 211/189 |
| 4,405,052 | A | 9/1983 | Spiros | |
| 4,553,725 | A * | 11/1985 | Vargo | A47B 57/16 211/187 |
| 4,955,743 | A * | 9/1990 | King | A47B 57/50 403/254 |
| 4,967,916 | A * | 11/1990 | Handler | A47B 57/44 108/188 |
| 5,299,690 | A * | 4/1994 | Mund | B42F 7/12 206/503 |
| 5,350,073 | A | 9/1994 | Thornley et al. | |
| 5,463,966 | A * | 11/1995 | Nilsson | F16B 12/34 108/110 |
| 5,653,349 | A * | 8/1997 | Dana | F16B 12/34 211/189 |
| 5,979,338 | A | 11/1999 | Salmanson et al. | |
| 6,293,507 | B1 * | 9/2001 | Gorniak | A47B 57/404 211/183 |
| 7,137,517 | B2 * | 11/2006 | Lowry | B65D 5/5033 211/188 |
| 7,252,202 | B2 * | 8/2007 | Saltzberg | A47B 57/50 211/187 |
| 8,585,313 | B2 * | 11/2013 | Wojotowicz | A47F 5/14 403/293 |
| 8,714,864 | B2 * | 5/2014 | Wojtowicz | A47F 5/14 403/286 |
| 8,967,401 | B2 * | 3/2015 | Wu | A47B 91/024 211/191 |
| 9,961,995 | B2 * | 5/2018 | Kam | A47B 47/028 |
| 10,329,794 | B2 * | 6/2019 | Tate | E04H 17/20 |
| 10,626,905 | B1 * | 4/2020 | Chiu | A47B 57/545 |
| 10,694,849 | B2 * | 6/2020 | Liss | A47B 47/021 |
| 2002/0195408 | A1 * | 12/2002 | Hegrenes | H05K 7/183 211/26 |
| 2007/0205169 | A1 * | 9/2007 | Fratilla | A47B 96/00 211/117 |
| 2010/0086348 | A1 * | 4/2010 | Funahashi | H02G 3/0608 403/306 |
| 2011/0272373 | A1 * | 11/2011 | Wojtowicz | A47F 5/14 211/134 |
| 2014/0284294 | A1 * | 9/2014 | Taylor | A47B 57/00 211/134 |
| 2017/0208939 | A1 | 7/2017 | Tsai | |
| 2019/0059588 | A1 | 2/2019 | Liss et al. | |

* cited by examiner

US 11,083,289 B2

CONNECTING DEVICE FOR MODULAR METAL SHELVING PROPS

OBJECT OF THE INVENTION

The present invention falls within the technical field of demountable shelves, more specifically those made of metal, and refers in particular to a device for joining modular metal shelving props, thanks to which it is possible to join two consecutive props longitudinally, without the need to use screws or other similar assembly accessories.

BACKGROUND OF THE INVENTION

Metal storage racks are widely known and used. Most of them have a frame made up of vertical props, of considerable height and high resistance to loads, to which horizontal beams are attached by means of groove-and-flange type couplings, to allow a quick, simple and solid assembly. To form the shelving system, horizontal panels are placed on the structure of this frame to support objects.

One of the main advantages of this type of shelving is its great versatility, as all its elements are mechanically coupled together, which allows them to adapt to all types of spaces and dimensions, even if they vary over time, by adding or removing elements from their frame. In the specific case of the props, on which the final height of the shelving system depends, various elements are known to form a temporary mechanical union that also ensures the necessary mechanical resistance of the resulting shelving system.

Various patent documents are known in the current state of the art concerning these prop connection elements. For example, U.S. patent publication number US2019059588 discloses a post coupling element that has one or more positive stops that limit the extension of one end of a post section into or over the coupling element. The stops can be either freely extended flanges or embossed from the sidewalls of the coupler. Among other things, this coupling element has the main disadvantages of not facing the top holes of the posts, as well as the fact that all its couplers are oriented in the same direction. Also, since it is based exclusively on external pressure to guarantee the union of the props, without allowing the insertion of any of its parts in the holes, the rigidity of the joints formed with this element is compromised and it is unstable.

Another example can be found in patent no. US2017208939, which discloses a shelf that includes a support frame and a plurality of folding posts to fit the support frame. Each folding post includes an upper post, a lower post and a post joint, where the upper and lower posts have a first post wall and a second post wall extended from the first wall at an angle. The post joint includes a mating tab extended from an end portion of the first post wall of the upper post member, a mating slot provided in an end portion of the first post wall of the lower post member, and a pivot hinge. When the post members are pivoted to engage the mating tongue with the mating slot, the upper and lower post members are coupled together end to end.

Finally, the Spanish utility model with publication number ES1193364U describes a connector for beams of palletized storage structures constituted from an angular profile in which two perpendicular branches are defined, so that one is fixed by welding to the end of the beam, while the free branch presents on its internal face and of fixation to the props some flanges or nails of fixation. More specifically, and in correspondence with its upper extremity, the free branch includes a conventional nail, below this and in vertical alignment, two mixed nails, in which a nail of smaller width participates, parallel to which is established a recess for retention or stop on the window of the prop, and finally below these, and also in vertical alignment, three conventional nails. This connector is also a complex and difficult to assemble solution.

Therefore, there is a need for modular metal shelving props, which are easy to assemble, highly versatile and ensure the strength of the shelving. It is also desirable that these joining devices are equipped with their own means of coupling with the props, making it unnecessary to use additional elements, such as clamping screws or similar, which complicate the assembly process and may compromise the stability of the racking by allowing it to become uncoupled, loosen or deteriorate over time.

DESCRIPTION OF THE INVENTION

The object of the invention consists of a connecting device for modular metal shelving props that allows a simple, fast and safe assembly of the frames that make up the structure of said type of metal shelves. For this purpose, the device is comprised of props, which can be joined lengthwise in a consecutive manner, and connecting elements of said props, to form a temporary mechanical coupling between two consecutive props.

The props comprise, as usual, a plurality of couplings, aligned longitudinally along the props, to enable couplings to be made at the desired height. Within this range of couplings, a distinction is made between distal couplings, located near the respective ends of the prop, and central couplings, distributed throughout the central sector of the prop.

Thus, the distal couplings are configured for connection to another prop during the shaping of a rack frame. On the other hand, the central couplings are configured for coupling the horizontal panels or trays, at the desired height, on which the objects stored in the rack are supported.

The couplings of the props which make up the device of invention comprise a central coupling sector, preferably circular, from which an adjustment slot starts perpendicularly. In the case of the distal couplings at one end of the prop, the orientation of the adjustment slot is opposite to that of the other housings, in order to facilitate the assembly operations, as will be shown later.

In an alternative embodiment of the device, from the central sector of the coupling two respective straight adjustment slots start, in diametrically opposite directions, which allow a bi-directional assembly and adjustment, i.e. both upwards and downwards, thus simplifying these tasks, which can be done in multiple orientations and directions and in the most convenient order at any given time.

In turn, each connection element is made up of a metal plate, which is made by stamping, and which incorporates a plurality of pins that can be inserted in the couplings of the device's props, and lateral ribs to reinforce and stiffen the plate.

In its preferred embodiment, the connecting element comprises four pins aligned longitudinally in a central sector of the plate. Two of these pins form a first grouping, intended to be inserted into the distal couplings of a prop, while the other two pins form a second grouping, insertable into corresponding distal couplings of another prop.

The device thus described makes it possible to carry out the assembly operations of modular metal shelving frames in a simple and effective manner, with any work orientation, without the need to use auxiliary joining elements such as screws, adjusting nuts or similar, which can slow down these tasks, as well as give rise to weak points in the resulting structure.

DESCRIPTION OF THE DRAWINGS

As a complement to the description provided herein, and for the purpose of helping to make the features of the invention more readily understandable, in accordance with a preferred practical exemplary embodiment thereof, said description is accompanied by a set of drawings which, by way of illustration and not limitation, represent the following.

PREFERRED EMBODIMENT OF THE INVENTION

Figure 1:
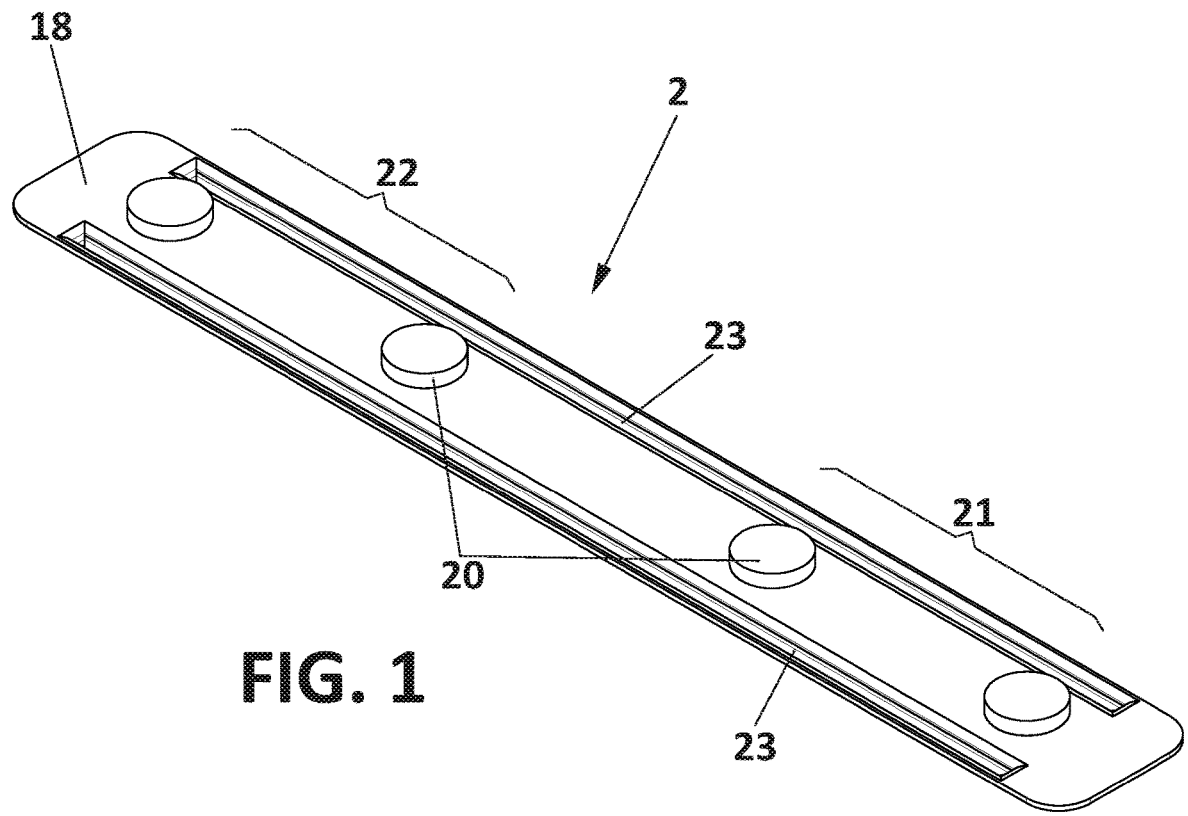
FIG. 1.—Shows a top view of the device's connecting element, showing its main constituent elements.

A detailed explanation of a preferred embodiment of the object of the present invention is provided below with the aid of the aforementioned figures.

The connecting device for modular metal shelving props described is intended to form a mechanical coupling between consecutive props, when assembling the frame of a modular metal shelf. For this purpose, the device comprises at least two props (1) and at least one connecting element (2) for a longitudinal mutual coupling of the two props (1).

As can be seen from the attached figures, each of the props (1) consists of an L-shaped profile, with an outer face (3), intended to face outwards, an inner face (4), intended to face inwards, a central sector (5) and two ends (6), located on two opposite sides of the central sector (5) respectively.

Figure 3:
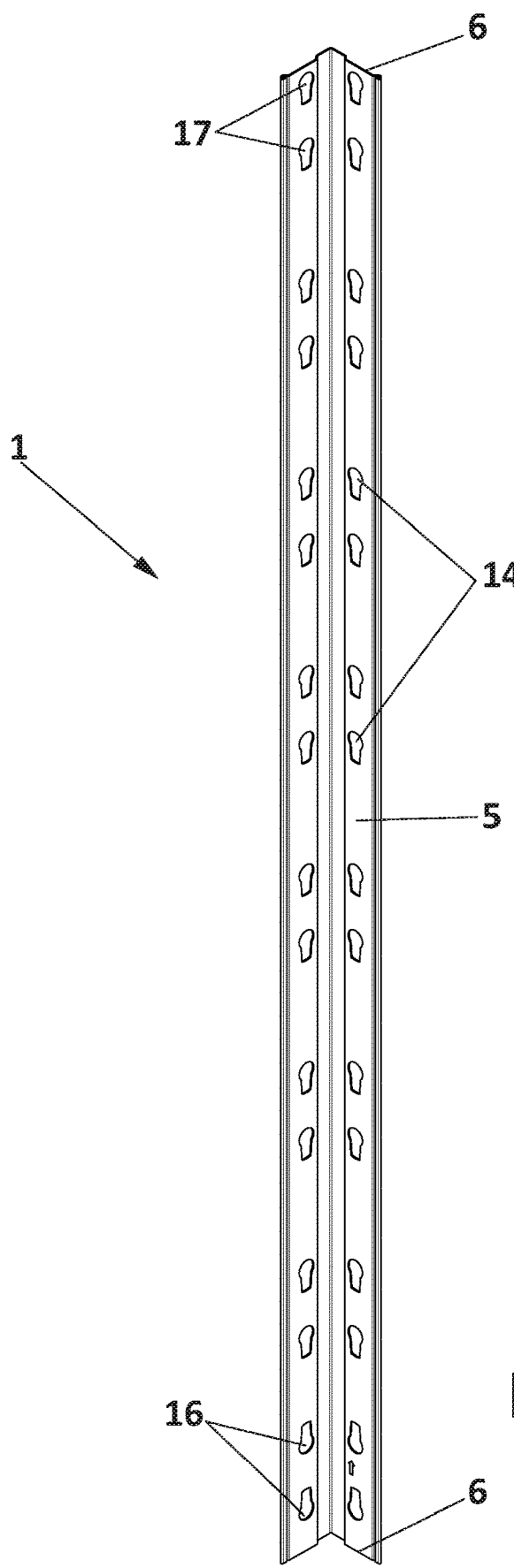
FIG. 3.—Shows a perspective view of a prop according to a first preferential realization of the device.

Thus, the profile that makes up a prop (1), shown in FIG. 3, comprises a first wing (7) and a second wing (8), angled with respect to the first wing (7). In this preferential design, the angle (9) between the wings (7,8) is 90°.

Each of the wings (7,8) comprises a plurality of couplings (10), aligned longitudinally so that, as can be seen in FIGS. 4-8, the couplings of the first wing (7) are aligned parallel to and coincide with the respective couplings (10) of the second wing (8).

Each of the coupling (10), which are through-hung to each of the wings (7,8), comprises a keyhole slot defined by a central coupling or central opening (11), of essentially circular geometry, from which a first straight adjustment slot (12) starts perpendicularly. In a second preferred embodiment of the device, shown in FIG. 8, the couplings (10) additionally comprise a second straight adjustment slot (13) which extends perpendicularly from the central coupling (11) in a direction diametrically opposite to that of the first adjustment slot (12).

In both cases, the couplings (10) of each of the props (1) include central couplings (14), located in the central sector (5) and configured to join horizontal trays (15), first distal couplings (16), located at one end (6), and second distal couplings (17), located at the other end (6).

Thus, to form a frame, as shown in FIGS. 4-7, two props (1) are arranged in close contact at their respective ends (6), with the first distal couplings (16) of one of the props (1) arranged consecutively to the second distal couplings (17) of the other prop (1).

Figure 2:
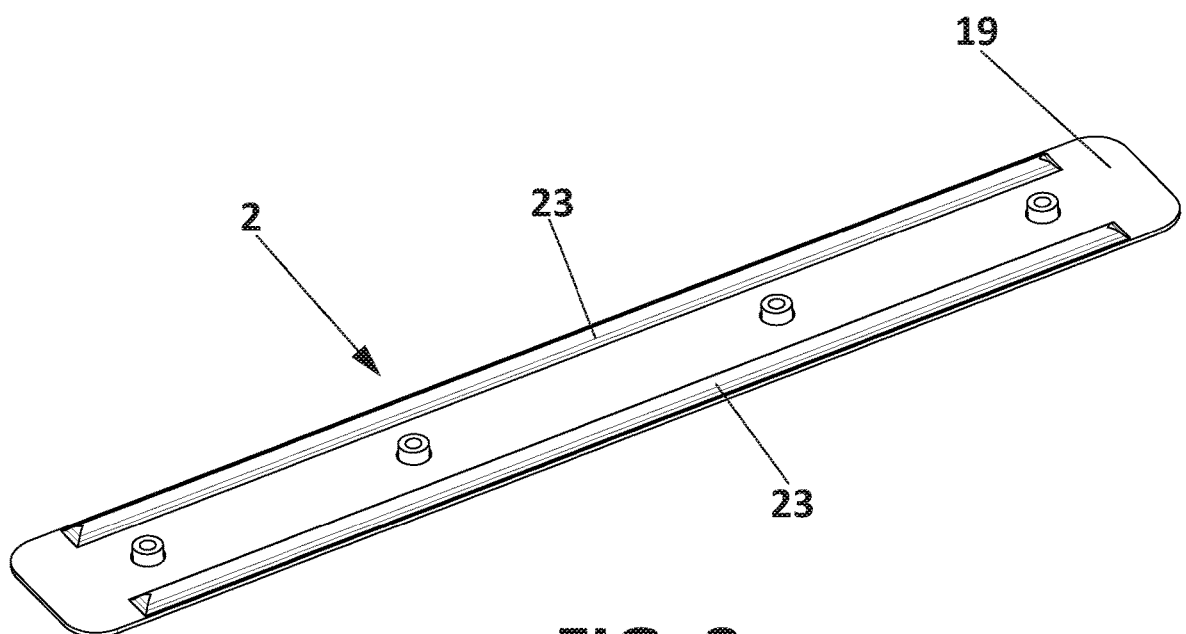
FIG. 2.—Shows a bottom perspective view of the connector in FIG. 1.

On the other hand, the connecting element (2) of the props (1), shown in FIGS. 1 and 2, is made up of a metal plate of essentially elongated geometry, which has a front face (18), aimed to be confronted to the inner face (4) of the prop (1), and a rear face (19), opposite to the front face (18).

From the front face (18), pins (20), which can be inserted into the distal couplings (16,17), and which, as illustrated in the above-mentioned figures, are arranged aligned on a central longitudinal axis of the plate. The pins (20) comprise a first grouping (21), intended to be inserted into the first distal couplings (16) of one prop (1), and a second grouping (22), intended to be inserted into the second distal couplings (17) of the other prop (1).

In this preferential implementation, the connecting element (2) comprises four pins (20), two of which form the first grouping (21) while the other two pins (20) form the second grouping (22).

The connecting element (2) also includes lateral stiffening ribs (23), which in this preferential design are located near two opposite perimeter edges of the plate, parallel to the central longitudinal axis on which the pins (20) are aligned.

As can be seen in the attached figures, in the preferential design of the connecting element (2), the pins (20) have an essentially cylindrical geometry, each one being topped off by an adjusting head (24), which has a circular geometry and a slightly larger diameter than that of the cylinder body.

In the first preferred embodiment of the device, shown in FIGS. 3-7, the first adjustment slots (12) of the first distal couplings (16) have a direction diametrically opposite to that of the first adjustment slot (12) of the central couplings (14) and the second distal couplings (17), to facilitate coupling with the coupling element (2).

Figure 4:
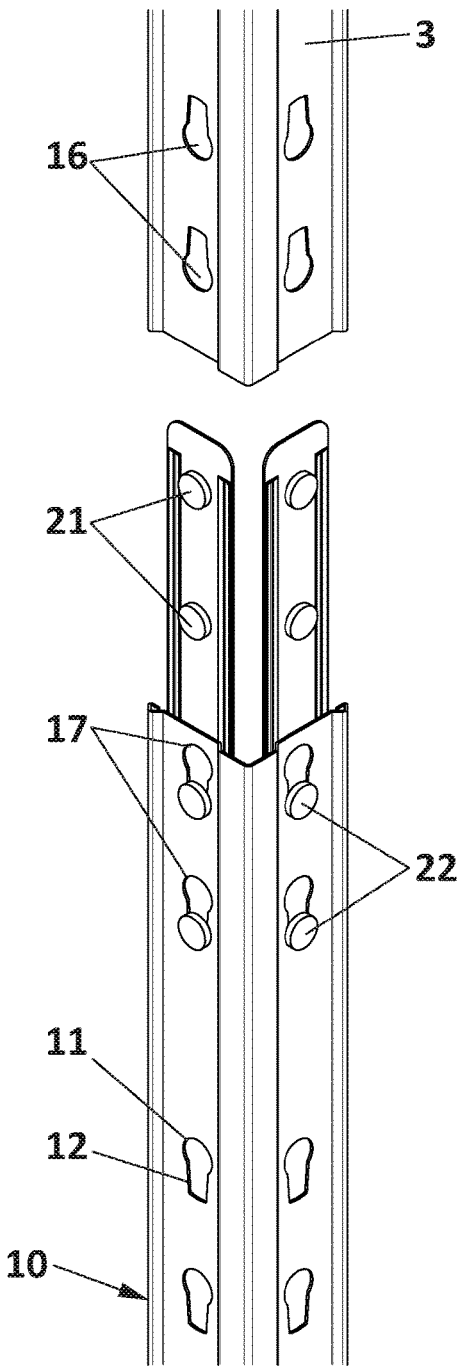
FIG. 4.—Shows a frontal perspective view of the first stage of a coupling sequence of two consecutive props, according to the first realization, with intermediation of the connecting element.
Figure 5:
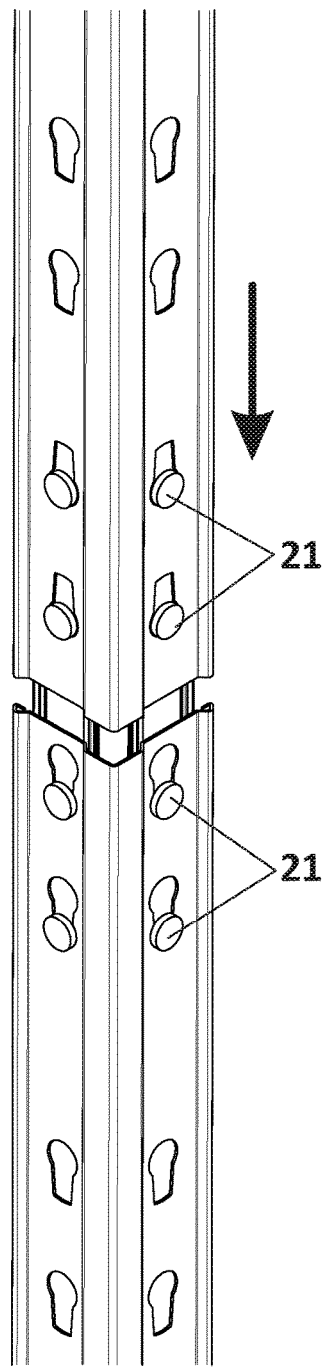
FIG. 5.—Shows a frontal perspective view of the second stage of a coupling sequence of two consecutive props, with intermediation of the connecting element.
Figure 6:
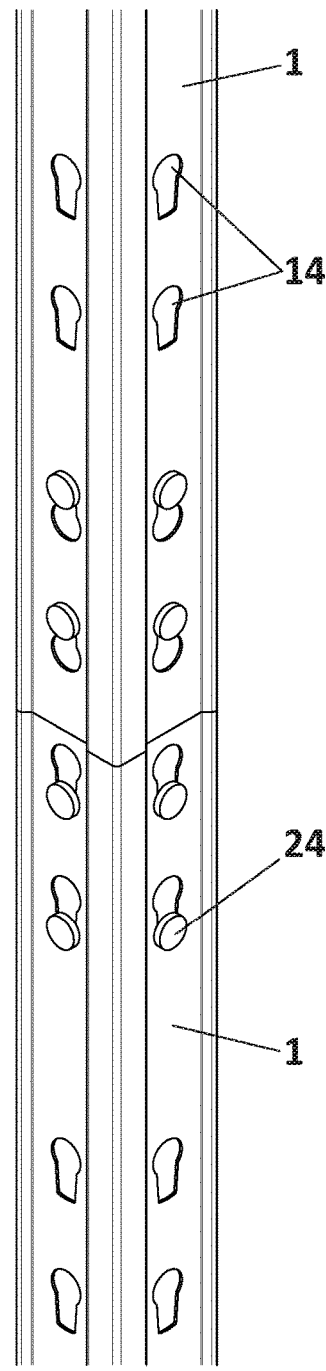
FIG. 6.—Shows a front perspective view of two consecutive props connected by the connecting element.
Figure 7:
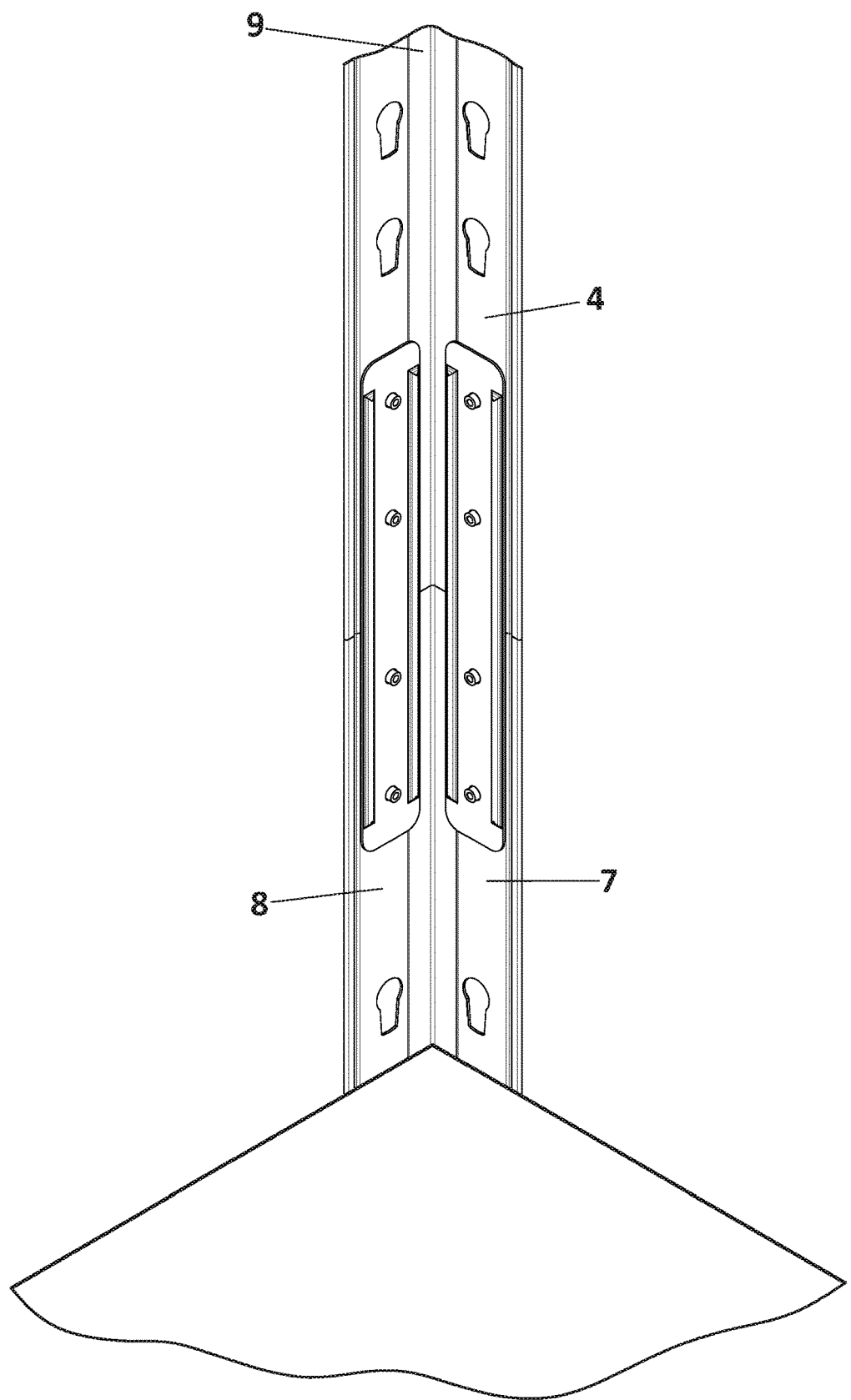
FIG. 7.—Shows a rear perspective view of FIG. 6.
Figure 8:
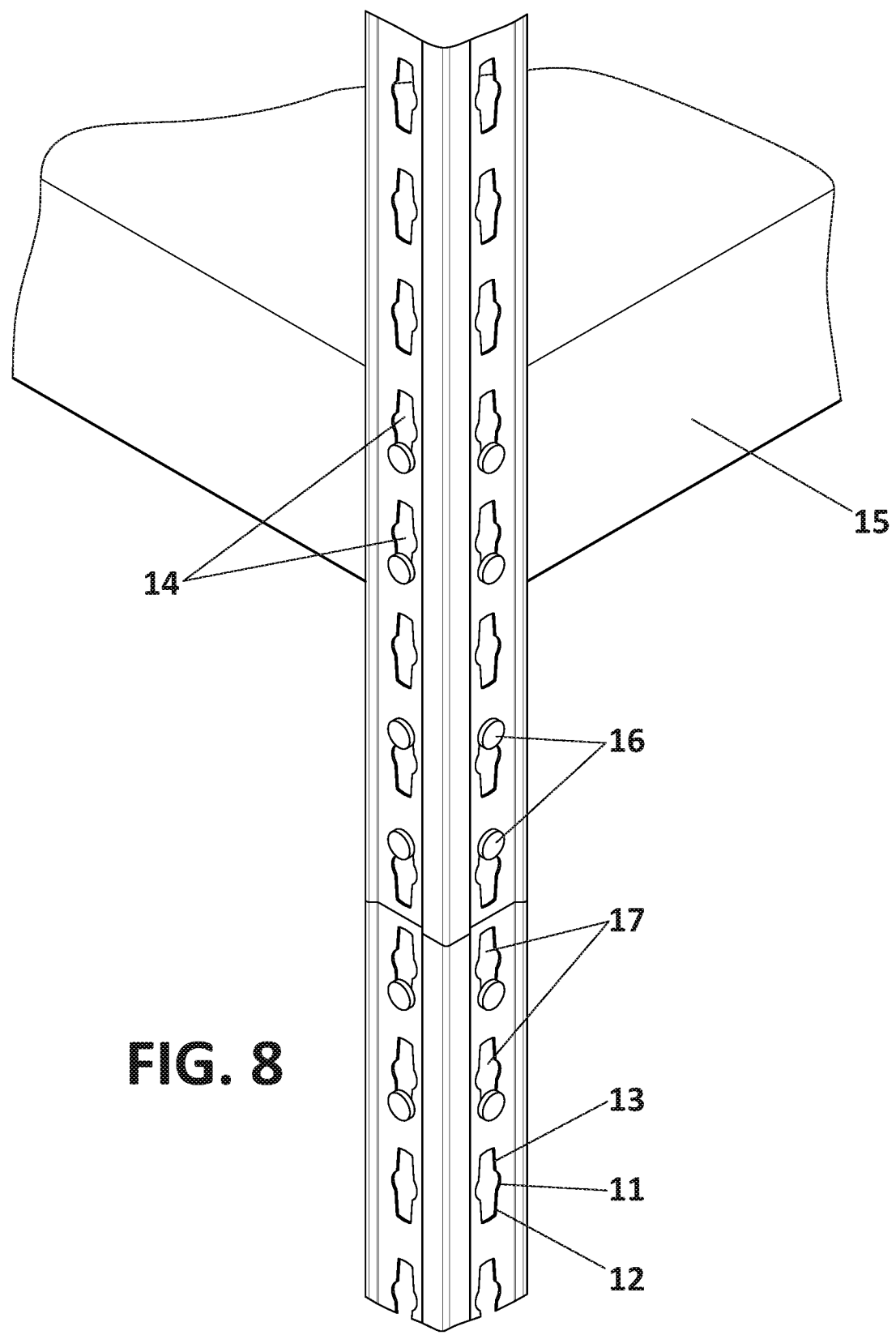
FIG. 8.—Shows a front perspective view of two consecutive props, according to a second preferential realization, coupled to each other by means of the connecting element.

FIGS. 4-6 show the coupling sequence of two consecutive props (1), with two connecting elements (2) intermediate, to form the frame of a modular metal rack according to the first preferential realization of the device described. Thus, this sequence begins with the placement of each of the connecting elements (2), confronted by their respective front faces (18) with the inner face (4) of the first wing (7) and the second wing (8), to proceed with the coupling of the pins (20) of the first grouping (21) to the pins of the first distal couplings (16) of one of the props (1).

This coupling is carried out by inserting the head (24) into the central coupling (11), and then sliding each of the plates through the respective first adjustment slots (12), until the heads (24) of these pins (20) of the first grouping (21) are pressed and retained inside the first distal couplings (16) of this prop (1).

Thus, with the connecting elements (2) attached to the first prop (1), the second distal couplings (17) of the other prop (1) are then attached to the pins (20) of the second groupings (22), which remain free until now, by inserting the heads (24) into the respective central couplings (11), as shown in FIG. 5.

After this insertion, adjustment takes place between the two props (1) by sliding each of the plates through the respective first adjustment slots (12) of the second distal couplings (17) until these pins (20) of the second groupings (22) are pressed into and retained within the second distal couplings (17) of the other prop (1), as shown in FIGS. 4 and 5.

The invention claimed is:

1. A connecting device for modular metal shelving props, to form a frame of a modular shelving system, the connecting device comprising:
at least two props, each comprising:
central couplings, located in a central sector of the prop,
first distal couplings, located at one end of the prop, and
second distal couplings, located at the other end,
in which each of the central couplings, the first distal couplings, and the second distal couplings comprises a keyhole slot defined by a central opening and a first adjustment slot extending perpendicularly from the central opening, and
at least one connecting element, for mutual coupling of the two props consecutively, comprising a metal plate with a front face from which pins start, in which the connecting element comprises:
a first grouping of pins, insertable in the first distal couplings of a prop, and
a second grouping of pins, which can be inserted into the second distal couplings of another prop,
the device being characterized in that the first adjustment slots of the first distal couplings are diametrically opposed to the first adjustment slots of the central couplings and the second distal couplings, in order to facilitate a coupling with the connecting element.

2. The connecting device according to claim 1 characterized in that the connecting element further comprises stiffening ribs.

3. The connecting device according to claim 2 characterized in that:
the pins are arranged in line with a central longitudinal axis of the plate, and
the stiffening ribs are located in the vicinity of two opposite perimeter edges of the plate, parallel to the central longitudinal axis on which the pins are aligned.

4. The connecting device according to claim 1 characterized in that:
the central opening has a circular geometry, and
each of the pins has a cylindrical geometry, and is looped off by an adjusting head with a circular geometry, which can be inserted into the central opening.

5. The connecting device according to claim 1 characterized in that each of the props is made up of an L-shaped profile comprising:
a first wing, and
a second wing, angled towards the first wing,
in which each of the wings comprises the central couplings, the first distal couplings, and the second distal couplings, and in which the central couplings, the first distal couplings, and the second distal couplings of the first wing are aligned parallel to and coincide with the respective central couplings, first distal couplings, and second distal couplings of the second wing.

6. The connecting device according to claim 1 characterized in that at least one of the central couplings, the first distal couplings, and the second distal couplings further comprises a second adjustment slot, which extends perpendicularly from the central opening in a direction diametrically opposite to that of the first adjustment slot.

* * * * *